US006436520B1

United States Patent
Yamamoto

(10) Patent No.: US 6,436,520 B1
(45) Date of Patent: *Aug. 20, 2002

(54) MAGNETIC DISPLAY DEVICE

(75) Inventor: Kazumi Yamamoto, Hiroshima-ken (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/654,082

(22) Filed: Sep. 1, 2000

Related U.S. Application Data

(63) Continuation-in-part of application No. 09/421,123, filed on Oct. 19, 1999, now Pat. No. 6,312,795.

(30) Foreign Application Priority Data

Sep. 1, 1999 (JP) ............................................ 11-247742

(51) Int. Cl.$^7$ .............................. B32B 7/02; B32B 5/16; B32B 27/00; B32B 5/00
(52) U.S. Cl. ........................ 428/220; 428/328; 428/332; 428/500; 428/900; 428/923; 428/924
(58) Field of Search ................................ 428/220, 323, 428/328, 329, 330, 332, 411.1, 500, 532, 537.5, 688, 689, 900, 923, 924; 252/62.51 R, 62.56, 62.57, 62.59, 62.54; 40/600, 621

(56) References Cited

U.S. PATENT DOCUMENTS 4,308,155 A * 12/1981 Tada et al. ................ 252/62.34
5,429,899 A * 7/1995 Chiba et al. .............. 430/106.6
5,994,990 A * 11/1999 Ogikubo ...................... 335/285
6,312,795 B1 * 11/2001 Yamamoto ................... 428/323

FOREIGN PATENT DOCUMENTS

| GB | 1167120 | 10/1969 |
| JP | 61 067203 | 4/1986 |
| JP | 05 308014 | 11/1993 |

\* cited by examiner

*Primary Examiner*—Paul Thibodeua
*Assistant Examiner*—Sheeba Ahmed
(74) *Attorney, Agent, or Firm*—Nixon & Vanderhye P.C.

(57) ABSTRACT

A magnetic display sheet of the present invention comprises:
  a magnet sheet having a magnetized surface, and a non-magnetized surface, which magnet sheet comprises: 400 to 1,900 parts by weight of at least one kind of magnetic particles selected from the group consisting of magnetoplumbite-structure ferrite particles and rare-earth magnet particles, as a filler, and 100 parts by weight of a binder comprising 50 to 95% by weight of at least one thermoplastic elastomer selected from the group consisting of a styrene-isoprene-styrene block copolymer resin, a styrene-ethylene.butylene-styrene block copolymer resin and an ethylene-propylene copolymer rubber, and 5 to 50% by weight of at least one soft polyolefin selected from the group consisting of a propylene homopolymer and a propylene-ethylene copolymer; and
  a printing paper sheet for being printed on, said paper sheet being bonded to said non-magnetized surface of said magnet sheet.

Such a magnetic display sheet is excellent in flexibility, mechanical properties, storage stability and product stability.

17 Claims, No Drawings

MAGNETIC DISPLAY DEVICE

CROSS REFERENCE TO RELATED APPLICATION

This is a continuation-in-part of application, Ser. No. 09/421,123 now U.S. Pat. No. 6,312,795B1, filed Oct. 19, 1999.

BACKGROUND OF THE INVENTION

The present invention relates to a magnetic display sheet, and more particularly, to a magnetic display sheet which is excellent in flexibility, mechanical properties, storage stability and product stability, and in which the content of magnetic particles can be considerably enhanced notwithstanding the amounts of plasticizer and lubricant used therein are considerably minimized.

A magnetic sheet for a magnetic display sheet has been produced by molding a composition comprising a binder and magnetic particles as a filler into a sheet having a thickness of about 0.1 to 2 mm, and then multipole-magnetizing the obtained sheet. The magnetic display sheet has been widely used in various application fields such as marks for sign or display, beginner's marks for automobiles, various fitting or attaching sheets as stationaries or office supplies, or sealing materials for doors, e.g., door packings for refrigerators.

In the case where the magnetic display sheet is fitted or attached to various objects, it is necessary that the magnetic display sheet is prevented from being slipped off or fallen off from the predetermined position. Further, when the magnetic display sheet is used as a sealing material for doors, it is necessary that the door can be brought into close contact with a body of equipment. In order to satisfy the above-described requirements, it has been demanded to enhance a filling property of magnetic particles in the magnetic sheet for the magnetic display sheet, i.e., to increase a content of magnetic particles in the magnetic sheet, thereby obtaining a large magnetic flux density on the surface of the magnetic sheet.

In general, the articles or objects to which the magnetic display sheet is to be fitted or attached, have not only simple flat surfaces but also irregular, partially sloped or complicated surfaces. In order to allow the magnetic display sheet to be fitted or attached onto such various surfaces in a close contact manner, and to be readily detached therefrom, the magnetic display sheet has been required to exhibit a good flexibility.

Also, it has been required that the magnetic display sheet is free from partial breakage or tear even after repeatedly attached and detached for a long period of time, namely the magnetic display sheet has been required to show an excellent mechanical strength.

From the description in Japanese Patent Application Laid-Open (KOKAI) No. 11-49904(1999): "as sound-insulating materials, . . . there have been proposed sheets prepared by adding a filler having a high specific gravity to a rubber component. . . . These sound-insulating materials are stored in stacks at factories or building sites after the production thereof until these materials are applied to apartment houses or individual detached houses. Here, there arises such a problem that the stacked sheets suffer from blocking therebetween during the storage, especially under high-temperature and high-humidity conditions such as in the summer season, because the rubber component is contained therein."; and in Japanese Patent Application Laid-Open (KOKAI) No. 11-90991(1999): "as damping sheets used for a folding plate-type roof, . . . there have been proposed composite damping materials comprising an elastomer and inorganic particles. However, in the case where the composite damping material is wound up into a roll upon the production thereof, it has been sometimes difficult to draw the sheet out of the roll because the composite damping material itself has a stickiness. In particular, under high-temperature conditions such as during the summer season or the like, such a tendency becomes remarkable. As a result, there arises such a problem that portions of the rolled composite damping material are adhered together, so that it is not possible to draw the sheet out of the roll.", in the case where magnetic sheets for the magnetic display sheets are preserved or stored in stacks, there tends to be caused such a phenomenon that the surfaces of these magnetic sheets for the magnetic display sheets are stuck together due to a rubber component contained in the resin, namely so-called blocking between the sheet is likely to occur. For this reason, it has been demanded to provide a magnetic sheet for the magnetic display sheets which is free from blocking during preservation or storage, i.e., is excellent in so-called storage stability.

Also, when the magnetic display sheet is kept fitted or attached onto any objects or articles for a long period of time, the plasticizer contained in the magnetic display sheet is bled out, so that the stickiness of the magnetic display sheet is increased. In this condition, when the magnetic display sheet is detached from the surfaces of the objects or articles, there tends to arise such a phenomenon that the surfaces of the objects or articles are contaminated with a sticky material peeled off from the rear surface of the magnetic sheet, i.e., so-called fogging phenomenon is likely to occur. Therefore, it has also been demanded to provide a magnetic display sheet which is free from any contamination even when being kept fitted or attached for a long period of time, namely is excellent in so-called product stability.

As conventional magnetic sheets for the magnetic display sheets, which exhibit an enhanced filling property of magnetic particles and a good flexibility, there have been widely used magnetic sheets in which a chlorine-containing resin such as, typically, polyethylene chloride, vinyl chloride resin, chlorosulfonated polyethylene or the like is used as a binder, and a plasticizer and a lubricant are mixed or blended therein in amounts of 1 to 120 parts by weight and 1 to 30 parts by weight, respectively, based on 100 parts by weight of the total amount of the binder.

In the above Japanese Patent Application Laid-Open (KOKAI) No. 11-90991(1999), there has been described the magnetic sheet using a styrene-isoprene block copolymer and an ethylene-vinyl acetate copolymer as a binder.

Also, European Patent Publication No. 0 690 092 A1 discloses a damping material comprising:

(a) a binder resin composed of 85 to 99% by weight of at least one base resin selected from polypropylenes, polystyrenes, acrylonitrile-butadiene-styrene copolymers, polycarbonates, polyphenylene ethers and modified polyphenylene ethers, and 1 to 15% by weight of styrene-isoprene-styrene block copolymer; and (b) 1 to 20 parts by weight, per 100 parts by weight of the binder resin, of iron compound particles.

It has been demanded to provide a magnetic sheet for the magnetic display sheet which is not only excellent in flexibility, mechanical strength, storage stability and product stability, but also can be considerably enhanced in content of magnetic particles. However, such magnetic sheets cannot be obtained yet.

Namely, in the above-described conventional magnetic sheet using the chlorine-containing resin as a binder, it is essentially required to not only increase the content of magnetic particles but also add a so-called plasticizer for imparting a plasticity and processability to the magnetic sheet, so that the plasticizer added tends to be bled out with the passage of time. For this reason, the conventional magnetic sheet is deteriorated in product stability as well as storage stability.

In addition, in the case where a lubricant is added in order to enhance the flowability of the chlorine-containing resin, the filling property, mechanical strength and product stability of the magnetic sheet for the magnetic display sheet can be improved. However, there arises such a problem that the magnetic sheet for the magnetic display sheet is extremely deteriorated in flexibility.

As is known in the art, chlorine-containing resins tend to generate harmful gases such as chlorine gas during processing thereof and, therefore, adversely affect the working environments. Also, when the chlorine-containing resins are incinerated upon disposal, harmful substances such as dioxin are produced, so that there is caused a problem that the environmental conditions are adversely affected.

Further, in the case of the magnetic sheet described in the above Japanese Patent Application Laid-Open (KOKAI) No. 11-90991(1999), when the content of magnetic particles is increased, the storage stability and product stability of the obtained magnetic sheet becomes deteriorated, as described in Comparative Examples hereinlater.

As a result of the present inventors' earnest studies for solving the above problems, it has been found that by bonding, by means of an adhesive or by a thermocompression bonding method, a printing paper sheet (printing display layer) on a magnetic sheet produced by using as a binder, a resin composition comprising 50 to 95% by weight of a thermoplastic elastomer of a styrene-isoprene-styrene block copolymer resin, a styrene-ethylene-butylene-styrene block copolymer resin and/or an ethylene-propylene copolymer rubber, and 5 to 50% by weight of a soft polyolefin of a propylene homopolymer and/or a propylene-ethylene copolymer, the obtained magnetic display sheet is not only excellent in flexibility, mechanical strength, storage stability and product stability but also exhibits a high filling property of magnetic particles, and is free from the generation of harmful substances such as dioxin even when subjected to incineration upon disposal, since no chlorine-containing resin is used as a binder therein. The present invention has been attained on the basis of this finding.

SUMMARY OF THE INVENTION

It is an object of the present invention to provide a magnetic display sheet which is excellent in flexibility, mechanical strength, storage stability and product stability.

To accomplish the aims, in a first aspect of the present invention, there is provided a magnetic display sheet comprising:

a magnetic sheet having a magnetized surface and a non-magnetized surface, which magnet sheet comprises:
400 to 1,900 parts by weight of at least one kind of magnetic particles selected from the group consisting of magnetoplumbite-structure ferrite particles and rare-earth magnet particles, as a filler, and
100 parts by weight of a binder comprising 50 to 95% by weight of at least one thermoplastic elastomer selected from the group consisting of a styrene-isoprene-styrene block copolymer resin, a styrene-ethylene-butylene-styrene block copolymer resin and an ethylene-propylene copolymer rubber, and 5 to 50% by weight of at least one soft polyolefin selected from the group consisting of a propylene homopolymer and a propylene-ethylene copolymer; and a printing paper sheet for being printed on, the paper sheet being bonded to the non-magnetized surface of the magnet sheet.

In a second aspect of the present invention, there is provided a magnetic display sheet comprising:

a magnetic sheet having a magnetized surface and a non-magnetized surface, which magnet sheet comprises:
400 to 1,900 parts by weight of at least one kind of magnetic particles selected from the group consisting of magnetoplumbite-structure ferrite particles and rare-earth magnet particles as a filler, and
100 parts by weight of a binder comprising:
50 to 95 parts by weight of at least one thermoplastic elastomer selected from the group consisting of a styrene-isoprene-styrene block copolymer resin, a styrene-ethylene.butylene-styrene block copolymer resin and an ethylene-propylene copolymer rubber, based on 100 parts by weight of the total amount of said thermoplastic elastomer and said soft polyolefin,
5 to 50 parts by weight of at least one soft polyolefin selected from the group consisting of a propylene homopolymer and a propylene-ethylene copolymer, based on 100 parts by weight of the total amount of said thermoplastic elastomer and said soft polyolefin, and
5 to 30 parts by weight of at least one modified resin selected from the group consisting of an ethylene-propylene-diene copolymer rubber and an ethylene-butene copolymer resin, based on 100 parts by weight of the total amount of said thermoplastic elastomer and said soft polyolefin; and
a paper sheet for being printed on, the paper sheet being bonded to the non-magnetized surface of the magnet sheet.

DETAILED DESCRIPTION OF THE INVENTION

The present invention will be described in detail below.

First, the magnetic sheet used in the present invention is explained.

The magnetic sheet used in the present invention can be produced by molding a composition which comprises magnetic particles as a filler, and a binder comprising at least one thermoplastic elastomer selected from the group consisting of a styrene-isoprene-styrene block copolymer resin, a styrene-ethylene.butylene-styrene block copolymer resin and an ethylene-propylene copolymer rubber, at least one soft polyolefin selected from the group consisting of a propylene homopolymer and a propylene-ethylene copolymer, and if required, at least one modified resin selected from the group consisting of an ethylene-propylene-diene copolymer rubber and an ethylene-butene copolymer resin, into a sheet.

As the styrene blocks of the styrene-isoprene-styrene block copolymer resin used as the thermoplastic elastomer in the present invention, there may be exemplified anionically polymerizable aromatic vinyl monomers such as styrene, 1-vinyl naphthalene, 2-vinyl naphthalene, 3-methyl styrene, 4-propyl styrene, 4-cyclohexyl styrene, 4-dodecyl styrene, 2-ethyl-4-benzyl styrene, 4-phenylbutyl styrene or the like. Among these monomers, styrene is especially preferred.

As the suitable isoprene blocks constituting a rubber component of the styrene-isoprene-styrene block copolymer resin, there may be exemplified isoprene or isoprene-butadiene. The content of the rubber component is preferably 40 to 90% by weight, more preferably 50 to 90% by weight based on the weight of the styrene-isoprene-styrene block copolymer. In the case of isoprene, in the consideration of tensile strength of the obtained magnetic sheet, the content of vinyl bond portions therein is preferably not less than 40% by weight, more preferably 50 to 80% by weight based on the weight of the styrene-isoprene-styrene block copolymer. In the case of isoprene-butadiene, in the consideration of flexibility of the obtained magnetic sheet, the content of the isoprene therein is preferably not less than 40% by weight, more preferably 50 to 80% by weight based on the weight of the styrene-isoprene-styrene block copolymer. The copolymer structure in the isoprene block may be either random, block or tapered.

The styrene-isoprene-styrene block copolymer has a density of usually 0.92 to 0.95 g/cc and a number-average molecular weight of usually 30,000 to 300,000. When the density of the styrene-isoprene-styrene block copolymer is less than 0.92 g/cc or when the number-average molecular weight thereof is less than 30,000, there may be a tendency that the block copolymer itself may be deteriorated in mechanical properties such as breaking strength, ductility or the like. When the density of the styrene-isoprene-styrene block copolymer is more than 0.95 g/cc or when the number-average molecular weight thereof is more than 300,000, the block copolymer may tend to be deteriorated in processability. The density of the styrene-isoprene-styrene block copolymer is preferably 0.93 to 0.94 g/cc, and the number-average molecular weight thereof is preferably 80,000 to 250,000.

The structure of blocks of the styrene-isoprene-styrene block copolymer may be represented by $A(BA)_n$ or $(AB)_n$, wherein A is a styrene block; B is an isoprene block; and n is an integer of not less than 1. Among these structures, $A(BA)_n$ is preferred.

As the above styrene-isoprene-styrene block copolymer, there may be used commercially available products such as HYBRAR VS-1 (tradename, produced by Kuraray Co., Ltd.) or the like.

The styrene-ethylene.butylene-styrene block copolymer resin used as the thermoplastic elastomer in the present invention, may be produced by first producing a styrene-butadiene-styrene block copolymer by subjecting styrene and diene to anionic polymerization in the presence of an alkyl lithium catalyst in a hydrocarbon solvent such as n-hexane or cyclohexane, and then hydrogenating the obtained styrene-butadiene-styrene block copolymer in a hydrocarbon solvent. The content of the ethylene-butylene block as a rubber component is preferably 63 to 87% by weight, more preferably 70 to 87% by weight. In the consideration of flexibility of the obtained magnetic sheet, the weight ratio of styrene to ethylene.butylene is preferably 13:87 to 37:63, more preferably 13:87 to 30:70. The density of the styrene-ethylene.butylene-styrene block copolymer is preferably 0.90 to 0.91 g/cc.

As the styrene-ethylene-butylene-styrene block copolymer resin, there may be exemplified commercially available products such as CRAYTON G1657 (tradename, produced by Shell Chemical Company) or the like.

As the ethylene-propylene copolymer rubber used as the thermoplastic elastomer in the present invention, there may be exemplified:

1) Resin blends comprising polyolefin such as polypropylene or polyethylene as a hard segment, and an ethylene.propylene rubber as a soft segment;
2) Resins prepared by polymerizing polypropylene or polyethylene as a hard segment with an ethylene.propylene rubber as a soft segment; or
3) Resins prepared by vulcanizing a soft segment in a blend comprising polypropylene or polyethylene as a hard segment and an ethylene.propylene rubber as the soft segment.

The content of the ethylene.propylene rubber as the soft segment, i.e., a rubber component is usually not less than 20% by weight, preferably 20 to 52% by weight based on the weight of the ethylene-propylene copolymer rubber, and the specific gravity thereof is preferably 0.86 to 0.88.

When the content of the ethylene-propylene rubber as a rubber component is less than 20% by weight, although the filling property of magnetic particles can be enhanced, the flexibility of the obtained magnetic sheet may tend to be deteriorated. In the consideration of the filling property of magnetic particles and the flexibility of the obtained magnetic sheet, the content of the ethylene.propylene rubber as a rubber component is more preferably 32 to 52% by weight, still more preferably 32 to 49% by weight based on the weight of the ethylene-propylene copolymer rubber, and the specific gravity thereof is more preferably 0.87 to 0.88.

As the above-described ethylene-propylene copolymer rubber, there may be used commercially available products such as EPT3070 (tradename, produced by Mitsui Chemicals Corporation).

The thermoplastic elastomers used in the present invention may be used singly or in the form of a mixture of any two or more thereof. In the case where the styrene-ethylene.butylene-styrene block copolymer and the styrene-isoprene-styrene block copolymer are used in combination, the weight ratio of the styrene-ethylene.butylene-styrene block copolymer to the styrene-isoprene-styrene block copolymer is preferably 1:1 to 2:1. In the consideration of flexibility of the obtained magnetic sheet, the styrene-ethylene.butylene-styrene block copolymer is preferred.

The amount of the thermoplastic elastomer in the binder used in the present invention is usually 50 to 95% by weight based on the weight of the total amount of the thermoplastic elastomer and the soft polyolefin resin.

When the amount of the thermoplastic elastomer blended is less than 50% by weight, it may become difficult to obtain a magnetic sheet having a sufficient flexibility, and the obtained magnetic sheet may tend to be deteriorated in product stability and storage stability.

When the amount of the thermoplastic elastomer blended is more than 95% by weight, it may become difficult to obtain a magnetic sheet which is sufficiently enhanced in filling property of magnetic particles.

In the consideration of the filling property of magnetic particles and the flexibility of the obtained magnetic sheet, the amount of the thermoplastic elastomer blended is preferably 55 to 90% by weight, more preferably 60 to 85% by weight based on the total amount of the thermoplastic elastomer and the soft polyolefin resin.

The soft polyolefin used in the present invention, has a melt flow rate at 230° C. according to ASTM D1238 of usually 1 to 40 g/10 min, a density of preferably 0.87 to 0.89 g/cc and a softening point of preferably 40 to 112° C.

The propylene homopolymer used as the soft polyolefin in the present invention, has a melt flow rate at 230° C.

according to ASTM D1238 of usually 1 to 40 g/10 min., more preferably 2 to 20 g/10 min., still more preferably 10 to 20 g/10 min., and a flexural modulus according to ASTM D1238 of usually 30 to 300 MPa, preferably 30 to 150 MPa.

The density of the propylene homopolymer is preferably 0.87 to 0.89 g/cc, and the softening point thereof is preferably 40 to 112° C., more preferably 40 to 100° C.

As the above propylene homopolymer, there may be used commercially available products such as FPOW101 (tradename, produced by Huntsman Chemical Corporation) or the like.

The propylene-ethylene copolymer used as the soft polyolefin in the present invention, has a melt flow rate at 230° C. according to ASTM D1238 of usually 1 to 40 g/10 min., preferably 2 to 20 g/10 min., more preferably 10 to 20 g/10 min., and a flexural modulus according to ASTM D1238 of usually 30 to 300 MPa, preferably 30 to 150 MPa.

The density of the propylene-ethylene copolymer used is preferably 0.87 to 0.89 g/cc, and the softening point thereof is preferably 40 to 112° C., more preferably 40 to 100° C.

As the above propylene-ethylene copolymer, there may be used commercially available products such as FPOW201 (tradename, produced by Huntsman Chemical Corporation) or the like.

The soft polyolefins used in the present invention may be used singly or in the form of a mixture of any two or more thereof. In the consideration of the flexibility and mechanical strength of the obtained magnetic sheet, the use of the propylene-ethylene copolymer is preferred.

The amount of the soft polyolefin blended in the magnetic sheet used in the present invention is usually 5 to 50% by weight based on the weight of the total amount of thermoplastic elastomer and the soft polyolefin resin.

When the amount of the soft polyolefin blended is less than 5% by weight, the filling property of magnetic particles may be deteriorated, so that the content of the magnetic particles may become insufficient, and as a result, the obtained magnetic sheet may be insufficient in surface magnetic flux density, and may show a tensile strength as low as less than 2.0.

When the amount of the soft polyolefin blended is more than 50% by weight, the obtained magnetic may be deteriorated in foldability, i.e., flexibility. In the consideration of the filling property of magnetic particles and the flexibility of the obtained magnetic sheet, the amount of the soft polyolefin blended is preferably 10 to 45% by weight, more preferably 15 to 40% by weight based on the weight of the total amount of the thermoplastic elastomer and the soft polyolefin resin.

At least one of modified resins selected from the group consisting of an ethylene-propylene-diene copolymer rubber and an ethylene-butene copolymer resin, may be inserted to the binder composed of the thermoplastic elastomer and the soft polyolefin resin.

The content of the propylene block of the ethylene-propylene-diene copolymer rubber used as the modified resin in the present invention, is preferably 20 to 30% by weight, more preferably 25 to 28% by weight. The ethylene-propylene-diene copolymer rubber has a melt flow rate at 230° C. according to ASTM D1238 of usually from not less than 0.1 g/10 min. and less than 1 g/10 min., preferably 0.2 to 0.8 g/10 min., and a Mooney viscosity (at 100° C.) of preferably 10 to 90, more preferably 70 to 88.

As the above ethylene-propylene-diene copolymer rubber, there may be used commercially available products such as EP57P (tradename, produced by JSR Co., Ltd.) or the like.

The ethylene-butene copolymer used as the modified resin in the present invention, may be either crystalline or amorphous. Among them, the amorphous ethylene-butene random copolymers are preferred. The butene content of the ethylene-butene copolymer is preferably 18 to 35% by weight, more preferably 20 to 32% by weight.

In addition, the Vicat softening point of the ethylene-butene copolymer according to JIS K7206 is preferably 30 to 60° C., more preferably 40 to 60° C.

As the above ethylene-butene copolymer, there may be used commercially available products such as EBM2011P (tradename, produced by JSR Co., Ltd.) or the like.

The amount of the modified resin blended in the magnetic sheet used in the present invention, is usually 5 to 30 parts by weight, preferably 7 to 20 parts by weight based on 100 parts by weight of the total amount of the thermoplastic elastomer and the soft polyolefin resin.

When the amount of the modified resin blended is less than 5 parts by weight, it may be difficult to obtain a more improvements of a sufficient storage stability.

When the amount of the modified resin blended is more than 30 parts by weight, it may be difficult to obtain a magnetic sheet which is sufficiently enhanced in filling property of magnetic particles.

The magnetic particles used in the present invention may be composed of magnetoplumbite-structure ferrite particles and/or rare-earth magnet particles which exhibit a surface magnetic flux density of not less than 100 Gauss when incorporated in the magnetic sheet, measured by a method of Examples described later.

As the magnetoplumbite-structure ferrite particles, there may be exemplified barium ferrite particles, strontium ferrite particles or barium-strontium ferrite particles, which are represented by the formula: $AO.nFe_2O_3$ (wherein A is Ba, Sr or Ba—Sr; and n is 5.0 to 6.5), or barium ferrite particles, strontium ferrite particles or barium-strontium ferrite particles further containing at least one element selected from the group consisting of Ti, Mn, Al, La, Zn, Bi and Co, in an amount of usually 0.1 to 7.0 mol %. The magnetoplumbite-structure ferrite particles used in the present invention, have an average particle size of usually 0.1 to 20.0 μm, preferably 1.0 to 5.0 μm, more preferably 1.0 to 2.0 μm; a BET specific surface area of usually 1 to 10 m²/g, preferably 1 to 5 m²/g, more preferably 1 to 2 m²/g; a coercive force (iHc) of usually 1,500 to 7,000 Oe, preferably 1,500 to 4,000 Oe, more preferably 1,500 to 2,000 Oe; and a residual magnetization of usually 20 to 60 emu/g, preferably 30 to 50 emu/g, more preferably 30 to 40 emu/g.

As the magnetoplumbite-structure ferrite particles, there may be used commercially available products such as GP-300 (tradename, produced by Toda Kogyo Corporation), HM410 (tradename, produced by Hoosier Magnetics Co., Ltd.) or the like.

As the rare-earth magnet particles, there may be exemplified rare-earth magnet particles represented by the formula: R—T—B or R—T—N, wherein R is at least one element selected from the group consisting of Sc, Y, La, Ce, Pr, Nd, Pm, Sm, Eu, Gd, Tb, Dy, Ho, Er, Tm, Yb and Lu; and T is at least one element selected from the group consisting of Fe, Co, Ni, Ga and Ti. Among them, rare-earth magnet particles represented by the above-described formulae, wherein R is Nd (a part of Nd may be substituted with any other rare earth element); and T is Fe (a part of Fe may be substituted with at least one element selected from the group consisting of Co, Ga and Ti), are preferred. The rare-earth magnet particles have an average particle size of usually 1 to 100 μm, preferably 1 to 80 μm, more preferably 3 to 50

μm; a BET specific surface area of usually 0.5 to 2 m$^2$/g, preferably 0.7 to 1.8 m$^2$/g; a coercive force (iHc) of usually 3,000 to 9,000 Oe, preferably 4,000 to 9,000 Oe; and a residual magnetization of usually 80 to 400 emu/g, preferably 100 to 400 emu/g.

As the rare-earth magnet particles, there may be used commercially available products such as MQP-B (tradename, produced by Magnequench Co., Ltd.) or the like.

The amount of the magnetic particles used in the magnetic sheet used in the present invention, is usually 400 to 1,900 parts by weight, preferably 600 to 1,800 parts by weight based on 100 parts by weight of the total amount of the thermoplastic elastomer and the soft polyolefin resin, or the total amount of the thermoplastic elastomer, the soft polyolefin resin and the modified resin.

When the amount of the magnetic particles used is less than 400 parts by weight, the obtained magnetic sheet may not exhibit a sufficient surface magnetic flux density and, therefore, may be deteriorated in magnetic force.

When the amount of the magnetic particles used is more than 1,900 parts by weight, the obtained magnetic sheet may not exhibit a sufficient flexibility due to less content of resin components.

The magnetic sheet used in the present invention has a surface magnetic flux density of usually 100 to 800 Gauss measured by the method of the Examples described later.

When the surface magnetic flux density is less than 100 Gauss, the magnetic sheet fitted or attached may tend to be readily slipped or fallen off even when being exposed to weak vibration or contact, due to less magnetic force thereof.

The upper limit of the surface magnetic flux density of the magnetic sheet is 800 Gauss at most. An excessive magnetization of the magnetic sheet is unnecessary and meaningless. When the surface magnetic flux density is more than 800 Gauss, the magnetic attraction force of the magnetic sheet becomes too strong. As a result, for example, it tends to be difficult to change the fitting or attaching position of the magnetic sheet. Further, when such magnetic sheets are stored in stacks, it tends to be difficult to peel off or separate each magnetic sheet from the stacked ones.

The magnetic sheet used in the present invention exhibits a flexural property of usually not more than 4.5 cm, preferably not more than 3.0 cm, more preferably not more than 2.0 cm and, therefore, is excellent in flexibility. The lower limit of the flexural property of the magnetic sheet is preferably 1.0 cm.

The magnetic sheet used in the present invention exhibits a tensile strength of usually not less than 2 MPa, preferably not less than 2.5 MPa and, therefore, is excellent in mechanical strength. The upper limit of the tensile strength of the magnetic sheet is preferably 4.0 MPa.

The magnetic sheet used in the present invention can be considerably enhanced in content of magnetic particles and can show an excellent flexibility, notwithstanding any plasticizer such as di-2-ethylhexyl phthalate, epoxidated linseed oil or butyl stearate, which have been conventionally used as an essential component when using the chlorine-containing resin, usually is used in an amount of less than 0.5 part by weight based on 100 parts by weight of the binder and preferably is not used.

Also, the magnetic sheet used in the present invention can be considerably enhanced in content of magnetic particles as well as mechanical strength even when no lubricant is used therein. However, in the consideration of flowability during the production process, the lubricant may be used in an amount of less than 1 part by weight based on 100 parts by weight of the binder. As the lubricant, there may be exemplified stearyl alcohol, stearic acid or the like.

The magnetic sheet used in the present invention may further contain, if required, appropriate additives such as various coupling agents, silica powder or the like, which have been usually blended in order to improve various properties of the magnetic sheet.

The coupling agent may be contained in an amount of 0.1 to 10 parts by weight based on 100 parts by weight of the binder.

The silica powder may be contained in an amount of 0.1 to 5 parts by weight based on 100 parts by weight of the binder. In the continuous kneading process for kneading the binder and the magnetic particles together, a suitable amount of the silica powder can be continuously fed together with the pelletized binder to a kneader. This process is industrially advantageous. Further, the silica powder has the effect of enhancing a storage stability and a product stability of the obtained magnetic sheet.

A magnetic display sheet according to the present invention comprises the above-mentioned magnetic sheet having a magnetized surface and a non-magnetized surface, and a printing paper sheet for being printed on, which is bonded to the non-magnetized surface of the magnetic sheet.

The lower limit of the thickness of the magnetic display sheet according to the present invention is usually 0.095 mm, preferably 0.1 mm, more preferably 0.15 mm, still more preferably 0.2 mm. The upper limit of the thickness of the magnetic display sheet according to the present invention is usually 2.0 mm, preferably 0.5 mm, more preferably 0.35 mm.

The lower limit of the thickness of the magnetic sheet used in the present invention is usually 0.05 mm, preferably 0.1 mm. The upper limit of the thickness of the magnetic sheet used in the present invention is usually 1.0 mm, preferably 0.3 mm, more preferably 0.2 mm, still more preferably 0.18 mm.

The lower limit of the thickness of the printing paper sheet used in the present invention is usually 0.045 mm, preferably 0.05 mm, more preferably 0.1 mm. The upper limit of the thickness of the printing paper sheet used in the present invention is usually 1.0 mm, preferably 0.3 mm, more preferably 0.15 mm.

As the printing paper sheet used in the present invention, there may be used any conventional printing papers without particular limitations. For example, wood free papers, synthetic papers or the like may be exemplified.

The magnetic display sheet according to the present invention exhibits an excellent storage stability, and requires no anti-transfer coating. Further, the magnetic display sheet according to the present invention can be readily printed, i.e., has a good printability.

Also, when using the printing paper sheet produced from a thermoplastic resin containing no halogen, the magnetic display sheet composed of the magnetic sheet and the printing paper sheet can be thermally plasticized, and readily recycled for reuse. In addition, even though the magnetic display sheet is incinerated, no harmful substances such as chlorine compounds are generated thereupon.

Next, the process for producing the magnetic sheet according to the present invention is described below.

The magnetic sheet according to the present invention can be produced by preliminarily kneading the thermoplastic elastomer, the soft polyolefin resin and, if required, the modified resin together by an ordinary method to obtain a pelletized binder, feeding the pelletized binder together with magnetic particles and, if required, additives to a continuous kneader in which these components are continuously kneaded, and then molding the kneaded material into a sheet-like material. The obtained sheet material is multipole-magnetized by an ordinary method, for example, by using a multipole-magnetizing device HD100 (pole pitch: 3 mm, magnetizing volt: 400 V, manufactured by Denshi Jiki Kogyo Co., Ltd.), to obtain a magnetic sheet.

The process for producing the magnetic display sheet according to the present invention will be described.

The magnetic display sheet according to the present invention is produced by bonding, by means of an adhesive or by a thermocompression bonding method, the printing paper sheet (printing display layer) on the above-mentioned magnetic sheet.

The printing paper sheet is constituted by a suitable paper material which may be selected according to a printing method used. For example, printing methods using simplified copying machines, simplified printers such as household printers, office printers or the like other than operational printers, can be exemplified. In addition, as conventional printing methods using the operational printers, there may be exemplified offset printing, gravure printing, screen printing, seal printing, fused-type thermal transfer printing, laser beam printing (LBP) or the like.

As the adhesives, there may be used any conventional adhesives without particular limitations as long as the magnetic sheet and the printing paper sheet can be properly bonded together therethrough. For instance, "Silex Clear" (produced by Konishi Co., Ltd.) may be suitably used as the adhesive. The adhesive is applied over the printing paper sheet in an amount of 10 to 20 g/cm$^2$, and the printing paper sheet is then bonded or laminated onto the magnetic sheet through the adhesive.

In the thermocompression bonding method, after the printing paper sheet and the magnetic sheet are superposed one over another, the obtained laminate are hot-pressed at 140° C./30 seconds under a pressure of 0.5 to 1 kg/cm$^2$.

When the synthetic paper is used as the printing paper sheet, the thickness of the synthetic paper is preferably not less than 0.1 mm, more preferably 0.1 to 0.15 mm in order to effectively prevent the printing display layer from being adversely affected by a color of a magnetic sheet. Further, in the consideration of the magnetic force and the more preferably thickness of the magnetic display sheet (0.2 to 0.35 mm), the thickness of the magnetic sheet is preferably 0.05 to 0.15 mm, more preferably 0.1 to 0.15 mm.

The important feature of the present invention is such a fact that in the case where a resin composition comprising 50 to 95% by weight of at least one thermoplastic elastomer selected from the group consisting of a styrene-isoprene-styrene block copolymer, a styrene-ethylene.butylene-styrene block copolymer and an ethylene-propylene copolymer rubber, and 5 to 50% by weight of at least one soft polyolefin selected from the group consisting of a propylene homopolymer and a propylene-ethylene copolymer is used as a binder constituting the magnetic sheet for the magnetic display sheet according to the present invention; and where magnetic particles constituting the magnetic sheet for the magnetic display sheet according to the present invention are blended with the binder in an amount of 400 to 1,900 parts by weight based on 100 parts by weight of the binder, the magnetic sheet constituting the magnetic display sheet according to the present invention can be considerably enhanced in content of the magnetic particles while maintaining a good flexibility and a good mechanical strength even when the amounts of plasticizer or lubricant used is minimized, especially even when no plasticizer is used therein.

The reason why the content of magnetic particles can be considerably enhanced, is considered as follows. That is, as described in Comparative Examples hereinafter, in any of the cases (i) where the above-specified thermoplastic elastomer is used together with the above-specified soft polyolefin resin but the amounts of these binder components used are out of the above-specified ranges; (ii) where the above-specified thermoplastic elastomer is used together with a soft polyolefin resin other than the above-specified ones; and (iii) where a thermoplastic elastomer other than the above-specified ones is used together with the above-specified soft polyolefin resin, it is not possible to enhance the content of magnetic particles while maintaining a good flexibility and a good mechanical strength of the magnetic sheet. Therefore, it is considered that only when the above-specified thermoplastic elastomer and the above-specified soft polyolefin resin are blended together in the above-specified amounts, the content of magnetic particles in the magnetic sheet can be enhanced while maintaining the good flexibility and the good mechanical strength.

Thus, the magnetic display sheet according to the present invention is excellent in not only flexibility and mechanical strength but also storage stability and product stability, and can be considerably enhanced in content of magnetic particles irrespective of minimizing the amounts of plasticizer and lubricant used. Therefore, the magnetic display sheet according to the present invention is suitable as a fitting or attaching sheet or a sealing material for doors.

In addition, since the binder constituting the magnetic sheet for the magnetic display sheet according to the present invention comprises no chlorine-containing resins, it is unlikely to generate hydrogen chloride during processing of the magnetic display sheet, resulting in easiness upon handling. Further, even when the magnetic display sheet is incinerated for disposal, any harmful substance such as dioxin is not generated and, therefore, no environmental pollution is caused.

Alternatively, in the case where the magnetic display sheet according to the present invention has a thickness of not more than 0.35 mm, since various letters, drawings, photos or the like can be printed on the magnetic display sheet by means of simplified copying machines, simplified printers such as household printers, office printers or the like other than operational printers, such a magnetic display sheet is suitable as marker or display sheets for sign, photos or the like.

EXAMPLES

The present invention is described in more detail by Examples and Comparative Examples, but the Examples are only illustrative and, therefore, not intended to limit the scope of the present invention.

Various properties were evaluated by the following methods.

(1) The average particle size of magnetic particles used in Examples and Comparative Examples hereinafter was expressed by the value measured by a laser diffraction-type granulometer (manufactured by Horiba Seisakusho Co., Ltd.).

(2) The magnetic properties of the magnetic particles were expressed by the values measured by a vibration sample-type magnetometer VSM-3S-15 (manufactured by Toei Kogyo Co., Ltd.).

(3) The magnetic properties of the magnetic sheet were expressed by the values obtained by measuring a surface magnetic force of a sheet specimen which was produced by cutting a hot-pressed sheet into a size of 50 mm×50 mm×1±0.1 mm and then magnetizing the cut sheet by a multipole-magnetizing device HD100 (pole pitch: 3 mm, manufactured by Denshi Jiki Kogyo Co., Ltd.), using a Gauss meter HGM8300M (manufactured by ADS Co., Ltd.).

(4) The mechanical strength of the magnetic sheet was determined as follows. First, a dumbbell-shaped test specimen No. 2 (width of parallel portion: 10 mm, length of parallel portion: 20 mm, thickness of parallel portion: not more than 3 mm, distance between bench marks: 20 mm) was prepared according to JIS K 6301-1975 ("3.2: Test specimen" in "Physical testing method for vulcanized rubbers"). The test specimen was pulled at a pulling rate of 50 mm/min. using a precision universal tester AG-1000B as a tensile tester (manufactured by Shimazu Seisakusho Co., Ltd.), thereby measuring a maximum stress (tensile strength: MPa) at which the test specimen was broken. The mechanical strength of the magnetic sheet was expressed by the measured value of the maximum stress.

(5) The flexibility of the magnetic sheet was expressed by the flexural (folding) property described at page 121 of "Bonded magnet" (1990) published by Gosei Jushi Kogyo Shinbunsha Co., Ltd., namely expressed by the length of the shortest specimen among those which were free from cracks or breakage when various test specimens being identical in width (1 cm) but different in length from each other were folded such that one end of each test specimen was overlapped on the other end thereof.

(6) The filling property of magnetic particles in the magnetic sheet was determined by visually observing whether any irregularities or holes were present on the surface of a 1 mm-thick sheet which was prepared by kneading a raw material for 20 minutes by rolls whose temperature was adjusted to 140° C., and then press-molding the kneaded material into a sheet at a temperature of 140±5° C.

Rank A: No irregularities or holes were observed.
Rank B: Irregularities or holes were observed.
The rank A is desired.

(7) The fogging of the magnetic sheet was determined as follows. That is, a sheet test specimen (10 mm×50 mm) was placed on a preparation glass plate (76 mm×26 mm) so as to come into close contact therewith, and allowed to stand at 60° C. for 12 hours. Thereafter, the sheet test specimen on the preparation glass plate was taken out and placed under an ordinary temperature condition, and the sheet test specimen was peeled off from the preparation glass plate. The surface of the preparation glass plate was visually observed to determine whether or not any contamination was caused thereon. The results of the observation are classified into the following two ranks.

Rank A: No contamination was observed.
Rank B: Contamination was observed.
The rank A is desired.

(8) The storage stability of the magnetic sheet was determined as follow. That is, three sheet test specimens (one sheet: 50 mm×50 mm×1 mm) stacked were placed in air at 60° C. while applying a load of 0.1 kg/cm² thereto. After 48 hours, the stacked test specimens were taken out and placed under a room temperature condition, and a middle specimen of the three sheet test specimens was peeled off from the other ones. The peeling conditions were visually observed. The results of the observation are classified into the following three ranks:

Rank AA: Readily peeled off and, therefore, practically usable;
Rank A: Peeled off but blocking was partially caused; and
Rank B: Peeled off but the sheet was broken, or not peelable
The ranks AA and A are desired.

(9) Evaluation of printability:
(a) Continuous printability:
Twenty magnetic display sheets each having a size of 210 mm×297 mm were set to various printers (for example, an ink jet printer "PM-750C" (manufactured by Epson Corp.), a laser beam printer "LBP-750C" (manufactured by Canon Co., Ltd.) and a copying machine "Able1321" (manufactured by Fuji Xerox Co., Ltd.)) and continuously printed. During the continuous printing operation, sheet-feeding condition of each printer and stoppage of operation of each printer due to jamming or retention of papers therein were observed. The evaluation results were classified into the following five ranks.

A: Excellent; No abnormal sheet-feeding and no paper-jamming;
B: Good; Abnormal sheet-feeding occurred one time, but no paper-jamming;
C: Normal; Abnormal sheet-feeding occurred two times, but no paper-jamming;
D: Poor; Abnormal sheet-feeding occurred three times, and paper-jamming occurred one time; and
E: Bad; Abnormal sheet-feeding occurred more than three times, and paper-jamming occurred not less than two times.
The ranks A, B and C are desired.

(b) Evaluation of images printed:
The image of a 5 mm-pitch cross-ruled pattern having a size of 150 mm×150 mm was printed on the magnetic display sheet. The width of line was 0.5 mm. The distortion of lines in the printed image was observed. Meanwhile, the "distortion" means deformation of lines including thin spots. The evaluation results were classified into the following three ranks.

A: Good; Line distortion of not more than 0.1 mm;
B: Normal; Line distortion of more than 0.1 mm and not less than 0.3 mm; and
C: Bad; Line distortion of more than 0.3 mm.
The ranks A and B are desired.

Production Example 1

A binder composed of 68 parts by weight of a thermoplastic elastomer A (styrene-ethylene.butylene-styrene block copolymer resin; CRAYTON G1657 (tradename) produced by Shell Chemical Corporation) and 32 parts by weight of a soft polyolefin resin F (propylene-ethylene copolymer; WL205 (tradename) produced by Huntsman Chemical Corporation) were blended and mixed with 1,000 parts by weight of magnetic particles C (HM410 (tradename) produced by Hoosier Magnetics Co., Ltd.). The obtained mixture was heated and melt-kneaded at a temperature of 160° C. for 20 minutes using test rolls. The obtained kneaded material was press-molded at a temperature of 140±5° C., thereby obtaining a magnetic sheet.

The magnetic sheet was further press-molded at a temperature of 150±5° C. to produce a magnetic sheet having a thickness of 0.15 mm. Various properties of the obtained magnetic sheets are shown in Tables 6 to 7.

Example 1

The obtained magnetic sheet obtained in Production Example 1 was bonded to a printing paper (wood free paper, "MJA4SP1" produced by Epson Corp.) as a printing display layer on which an adhesive "Silex Clear" (produced by Konishi Co., Ltd.) was previously applied in an amount of 10 g/cm², thereby obtaining a magnetic display sheet. The thus obtained magnetic display sheet had a thickness of 0.3 mm and a size of A4, i.e., 210 mm in width×297 mm in length.

Alternatively, different kinds of synthetic papers were used as the printing display paper depending upon the printing method used. Typical four examples of the synthetic papers as produced are shown Table 1.

TABLE 1

| Synthetic paper 1 | PET-based paper for ink jet printing; "Peach Coat SEY-130BPF" produced by Nishinbo Co., Ltd. (thickness: 0.13 mm) |
| Synthetic paper 2 | PP-based paper for ink jet printing; "Peach Coat SPUY-115PEX" produced by Nishinbo Co., Ltd. (thickness: 0.12 mm) |
| Synthetic paper 3 | PET-based paper for LBP; "Peach Coat WEY-120T" produced by Nishinbo Co., Ltd. (thickness: 0.13 mm) |
| Synthetic paper 4 | PP-based paper for LBP; "Peach Coat SPUY-115PEX" produced by Nishinbo Co., Ltd. (thickness: 0.12 mm) |

The obtained magnetic display sheets were printed using an ink jet printer "PM-750C" (manufactured by Epson Corp.), a laser beam printer "LBP-750C" (manufactured by Canon Co., Ltd.) and a copying machine "Able1321" (manufactured by Fuji Xerox Co., Ltd.).

In the obtained magnetic display sheet composed of the magnetic sheet having a thickness of 0.15 mm and the above Synthetic paper 2 having a thickness of 0.12 mm, various properties (magnetic flux density, tensile strength, flexural property, filling property, product stability and storage stability) thereof are shown in Tables 8 and 9.

Further, it was confirmed that each of the obtained magnetic display sheets had an excellent printability and the resultant printed images were clear. Various properties of each of the magnetic display sheets obtained by using a wood free paper and Synthetic papers 1 to 4 as a printing display paper, are shown in Table 10.

Production Examples 2 to 20

The same procedure as defined in Production Example 1 was conducted except that kind and amount of binder, kind and amount of magnetic particles, kinds and amounts of plasticizer and lubricant and kind and amount of additive were changed variously, thereby obtaining a magnetic sheet.

The kinds and product names of binder used and various conditions are shown in Table 2. The kinds of magnetic particles are shown in Table 3. Main production conditions are shown in Tables 4 to 5. Various properties of the obtained magnetic sheets are shown in Tables 6 to 7.

Examples 2 to 20

The same procedure as defined in Example 1 was conducted except that the printing paper (wood free paper) and the synthetic papers 1 to 4 used in Example 1 were laminated on respective magnetic sheet obtained in Production Examples 2 to 20, thereby producing magnetic display sheets.

The continuous printability of the obtained magnetic display sheets as well as printed images formed thereon was evaluated by the same method as defined above.

Meanwhile, in the case of the magnetic display sheets obtained by laminating the synthetic papers 1 to 4 on the magnetic sheets obtained in Production Examples 2 to 20, it was confirmed that even when misprinted or used ones were cut and shredded by a shredder and charged into a kneader used for the production of magnetic sheet in an amount of not more than 20% based on the whole raw material, the obtained magnetic sheets could still exhibit excellent properties.

In the obtained magnetic display sheet composed of the magnetic sheet having a thickness of 0.15 mm and the above Synthetic papers 1 to 4 having a thickness of 0.12~0.13 mm, various properties (magnetic flux density, tensile strength, flexural property, filling property, product stability and storage stability) thereof are shown in Tables 8 and 9.

Further, it was confirmed that each of the obtained magnetic display sheets had an excellent printability and the resultant printed images were clear. Various properties of each of the magnetic display sheets obtained by using a wood free paper and Synthetic papers 1 to 4 as a printing display paper, are shown in Table 10.

TABLE 2

| Kind of resin | |
|---|---|
| Thermoplastic elastomer A | styrene-ethylene.butylene-styrene block copolymer |
| Thermoplastic elastomer B | styrene-isoprene-styrene block copolymer |
| Thermoplastic elastomer C | ethylene.propylene copolymer rubber |
| Polyolefin resin F | Propylene-ethylene copolymer |
| Polyolefin resin G | Propylene homopolymer |
| Modified resin J | Ethylene-butene-1 copolymer rubber |
| Modified resin K | Ethylene.propylene.diene copolymer rubber |

| Kind of resin | Product name and properties |
|---|---|
| A | CRAYTON G1657 (tradename, produced by Shell Chemical Company) (rubber component: 87 wt %; styrene:ehtylene.butylene = 13:87, straight-chain structure, density: 0.91 g/cc) |
| B | HYBRAR VS-1 (tradename, produced by Kuraray Co., Ltd.) (rubber component: 70 wt %, radial structure, density: 0.94 g/cc) |
| C | EPT3070 (Mitsui Chemicals Corporation) (rubber component: 45 wt %, specific gravity: 0.86, straight-chain structure, density: 0.88 g/cc) |
| F | FPO W201 (tradename, produced by Huntsman Chemical Corporation) (molecular weight: 21000, density: 0.87 g/cc, softening point: 48° C.) |
| G | FPO W101 (tradename, produced by Huntsman Chemical Corporation) (molecular weight: 22000, melt flow rate: 16 g/10 min., flexural modulus: 37 Mpa, density: 0.87 g/cc, softening point: 48° C.) |
| J | EBM 2011p (tradename, produced by JSR Co., Ltd.) (butene content: 20 wt %, Vicat softening point: 60° C., density: 0.88 g/cc) |
| K | EP57P (tradename, produced by JSR Co., Ltd.) (propylene content: 26 wt %, Mooney viscosity: 88, melt flow rate: 0.4 g/10 min., density: 0.87 g/cc) |

TABLE 3

| | Magnetic particles | |
|---|---|---|
| Kind | | Product name and properties |
| Magnetic particles a | Barium ferrite particles | GP300 (produced by Toda Kogyo Co., Ltd.) (composition: BaO.6Fe$_2$O$_3$, average particle size: 1.9 $\mu$m, BET specific surface area: 1.5 m$^2$/g, coercive force (iHc) : 1900 Oe, residual magnetization 40 emu/g) |
| Magnetic particles b | Rare-earth magnet particles | MQP-B (Magnequench Co., Ltd.) (composition: Nd$_2$Fe$_{14}$B, average particle size: 50 $\mu$m, BET specific surface area: 0.5 m$^2$/g, coercive force (iHc): 7700 Oe, residual magnetization 350 emu/g) |

TABLE 4

| | Production of magnetic sheet | | | |
|---|---|---|---|---|
| | Thermoplastic elastomer | | Polyolefin resin | |
| Production Examples | Kind | Amount (part by weight) | Kind | Amount (part by weight) |
| Production Example 2 | A | 80 | F | 20 |
| Production Example 3 | B | 50 | G | 50 |
| Production Example 4 | B | 80 | F | 20 |
| Production Example 5 | C | 50 | G | 50 |
| Production Example 6 | C | 80 | F | 20 |
| Production Example 7 | A<br>B | 30<br>30 | G | 40 |
| Production Example 8 | B | 60 | F<br>G | 20<br>20 |
| Production Example 9 | A | 60 | G | 40 |
| Production Example 10 | A | 50 | F | 50 |

| | Production of magnetic sheet | | | |
|---|---|---|---|---|
| | Other resin | | Magnetic particles | |
| Production Examples | Kind | Amount (part by weight) | Kind | Amount (part by weight) |
| Production Example 2 | — | — | a | 950 |
| Production Example 3 | — | — | a | 1100 |
| Production Example 4 | — | — | a | 1100 |
| Production Example 5 | — | — | a | 1100 |
| Production Example 6 | — | — | a | 1100 |
| Production Example 7 | — | — | a | 1100 |
| Production Example 8 | — | — | a | 1100 |
| Production Example 9 | — | — | b | 400 |
| Production Example 10 | — | — | b | 850 |

TABLE 5

| | Production of magnetic sheet | | | |
|---|---|---|---|---|
| | Thermoplastic elastomer | | Polyolefin resin | |
| Production Examples | Kind | Amount (part by weight) | Kind | Amount (part by weight) |
| Production Example 11 | C | 70 | F | 30 |
| Production Example 12 | A | 70 | G | 30 |
| Production Example 13 | A | 80 | F | 10 |
| Production Example 14 | C | 50 | F | 25 |
| Production Example 15 | B<br>A | 30<br>30 | F | 25 |
| Production Example 16 | A<br>B | 50<br>25 | F | 25 |
| Production Example 17 | B | 50 | F | 50 |
| Production Example 18 | C | 50 | F | 50 |
| Production Example 19 | A | 75 | G | 25 |
| Production Example 20 | A | 75 | F | 25 |

| | Production of magnetic sheet | | | |
|---|---|---|---|---|
| | Other resin | | Magnetic particles | |
| Production Examples | Kind | Amount (part by weight) | Kind | Amount (part by weight) |
| Production Example 11 | — | — | b<br>a | 800<br>400 |
| Production Example 12 | J | 10 | a | 1700 |
| Production Example 13 | J | 10 | a | 1100 |
| Production Example 14 | K | 25 | a | 1100 |
| Production Example 15 | K | 15 | a | 1100 |
| Production Example 16 | — | — | a | 900 |
| Production Example 17 | — | — | b | 850 |
| Production Example 18 | — | — | b | 850 |
| Production Example 19 | — | — | a | 950 |
| Production Example 20 | — | — | a | 950 |

TABLE 6

| | Properties of magnetic sheet | | | |
|---|---|---|---|---|
| Production Examples | Thickness (mm) | Surface magnetic flux density (Gauss) | Tensile strength (Mpa) | Flexural property (cm) |
| Production Example 1 | 0.15 | 120–130 | 3.0 | $\leq$2.0 |
| Production Example 2 | 0.15 | 130–150 | 3.6 | $\leq$2.0 |
| Production Example 3 | 0.10 | 100–110 | 2.9 | $\leq$2.0 |
| Production Example 4 | 0.13 | 110–120 | 3.0 | $\leq$2.0 |
| Production Example 5 | 0.17 | 160–170 | 2.7 | $\leq$2.0 |

TABLE 6-continued

| Production Examples | | | | |
|---|---|---|---|---|
| Production Example 6 | 0.15 | 150–160 | 3.1 | ≦2.0 |
| Production Example 7 | 0.15 | 150–160 | 2.8 | ≦2.0 |
| Production Example 8 | 0.15 | 150–160 | 2.5 | ≦2.0 |
| Production Example 9 | 0.15 | 130–140 | 3.0 | ≦2.0 |
| Production Example 10 | 0.15 | 190–200 | 2.5 | ≦2.0 |

| | Properties of magnetic sheet | | |
|---|---|---|---|
| Production Examples | Filling property | Product stability | Storage stability |
| Production Example 1 | A | A | A |
| Production Example 2 | A | A | A |
| Production Example 3 | A | A | A |
| Production Example 4 | A | A | A |
| Production Example 5 | A | A | A |
| Production Example 6 | A | A | A |
| Production Example 7 | A | A | A |
| Production Example 8 | A | A | A |
| Production Example 9 | A | A | A |
| Production Example 10 | A | A | A |

TABLE 7

| | | Properties of magnetic sheet | | |
|---|---|---|---|---|
| Production Examples | Thickness (mm) | Surface magnetic flux density (Gauss) | Tensile strength (Mpa) | Flexural property (cm) |
| Production Example 11 | 0.17 | 160–180 | 2.8 | ≦2.0 |
| Production Example 12 | 0.15 | 160–180 | 3.4 | ≦2.0 |
| Production Example 13 | 0.13 | 100–120 | 3.0 | ≦2.0 |
| Production Example 14 | 0.10 | 100–120 | 2.8 | ≦2.0 |
| Production Example 15 | 0.15 | 140–160 | 2.8 | ≦2.0 |
| Production Example 16 | 0.15 | 120–140 | 2.5 | ≦2.0 |
| Production Example 17 | 0.15 | 190–200 | 2.5 | ≦2.0 |
| Production Example 18 | 0.15 | 190–200 | 2.5 | ≦2.0 |
| Production Example 19 | 0.15 | 100–110 | 3.8 | ≦2.0 |
| Production Example 20 | 0.15 | 100–110 | 3.5 | ≦2.0 |

| | Properties of magnetic sheet | | |
|---|---|---|---|
| Production Examples | Filling property | Product stability | Storage stability |
| Production Example 11 | A | A | AA |
| Production Example 12 | A | A | AA |
| Production Example 13 | A | A | AA |
| Production Example 14 | A | A | AA |
| Production Example 15 | A | A | AA |
| Production Example 16 | A | A | A |
| Production Example 17 | A | A | A |
| Production Example 18 | A | A | A |
| Production Example 19 | A | A | A |
| Production Example 20 | A | A | A |

TABLE 8

| | | Properties of magnetic display sheet | | |
|---|---|---|---|---|
| Production Examples | Thickness (mm) | Surface magnetic flux density (Gauss) | Tensile strength (Mpa) | Flexural property (cm) |
| Example 1 | 0.25 | 100–110 | 2.0 | ≦2 |
| Example 2 | 0.3 | 140–150 | 3.5 | ≦2 |
| Example 3 | 0.3 | 150–160 | 3.5 | 2 |
| Example 4 | 0.32 | 150–160 | 3.3 | 2.5 |
| Example 5 | 0.3 | 150–160 | 3 | 2.5 |
| Example 6 | 0.28 | 150–160 | 3.5 | 3.0 |
| Example 7 | 0.3 | 150–160 | 3.5 | 3.0 |
| Example 8 | 0.3 | 150–160 | 3.4 | 2.5 |
| Example 9 | 0.3 | 140–150 | 3.5 | ≦2 |
| Example 10 | 0.3 | 220–230 | 3 | ≦2 |

| | Properties of magnetic display sheet | | |
|---|---|---|---|
| Examples | Filling property | Product stability | Storage stability |
| Example 1 | A | A | A |
| Example 2 | A | A | A |
| Example 3 | A | A | A |
| Example 4 | A | A | A |
| Example 5 | A | A | A |
| Example 6 | A | A | A |
| Example 7 | A | A | A |
| Example 8 | A | A | A |
| Example 9 | A | A | A |
| Example 10 | A | A | AA |

TABLE 9

| | | Properties of magnetic display sheet | | |
|---|---|---|---|---|
| Examples | Thickness (mm) | Surface magnetic flux density (Gauss) | Tensile strength (Mpa) | Flexural property (cm) |
| Example 11 | 0.3 | 170–180 | 3.2 | 2.5 |
| Example 12 | 0.3 | 170–180 | 3.4 | ≦2.0 |
| Example 13 | 0.3 | 140–150 | 3 | ≦2.0 |
| Example 14 | 0.3 | 140–150 | 2.8 | ≦2.0 |
| Example 15 | 0.3 | 140–150 | 3.1 | ≦2.0 |
| Example 16 | 0.3 | 100–110 | 2.8 | ≦2.0 |
| Example 17 | 0.3 | 200–210 | 2.7 | 2.5 |
| Example 18 | 0.3 | 200–210 | 3.1 | 2.5 |
| Example 19 | 0.3 | 130–140 | 4.1 | ≦2.0 |
| Example 20 | 0.3 | 140–150 | 3.8 | 2.5 |

TABLE 9-continued

| | Properties of magnetic display sheet | | |
|---|---|---|---|
| Production Examples | Filling property | Product stability | Storage stability |
| Example 11 | A | A | AA |
| Example 12 | A | A | AA |
| Example 13 | A | A | AA |
| Example 14 | A | A | AA |
| Example 15 | A | A | AA |
| Example 16 | A | A | A |
| Example 17 | A | A | A |
| Example 18 | A | A | A |
| Example 19 | A | A | A |
| Example 20 | A | A | A |

TABLE 10

| | Evaluation of printability: continuous printing Ink jet printer "PM-750C" (Epson Corp.) | | |
|---|---|---|---|
| Examples | Wood free paper | Synthetic paper 1 | Synthetic paper 2 |
| Example 1 | A | A | A |
| Example 2 | A | A | A |
| Example 3 | B | B | B |
| Example 4 | B | B | A |
| Example 5 | C | C | B |
| Example 6 | C | C | B |
| Example 7 | A | C | C |
| Example 8 | B | A | A |
| Example 9 | B | B | C |
| Example 10 | C | C | A |
| Example 11 | B | B | B |
| Example 12 | B | C | C |
| Example 13 | B | C | C |
| Example 14 | B | B | B |
| Example 15 | B | C | C |
| Example 16 | C | C | C |
| Example 17 | C | C | B |
| Example 18 | C | C | C |
| Example 19 | C | C | C |
| Example 20 | C | C | C |

| | Evaluation of printability: continuous printing Laser printer "LBP-750C" (Canon Co., Ltd.) | | |
|---|---|---|---|
| Examples | Wood tree paper | Synthetic paper 3 | Synthetic paper 4 |
| Example 1 | A | A | A |
| Example 2 | A | A | A |
| Example 3 | B | A | B |
| Example 4 | B | B | C |
| Example 5 | C | B | B |
| Example 6 | C | C | C |
| Example 7 | B | C | C |
| Example 8 | B | C | B |
| Example 9 | C | B | B |
| Example 10 | A | C | C |
| Example 11 | B | B | C |
| Example 12 | B | B | B |
| Example 13 | C | B | B |
| Example 14 | C | B | B |
| Example 15 | B | C | B |
| Example 16 | B | B | C |
| Example 17 | C | B | C |
| Example 18 | C | B | B |
| Example 19 | C | C | C |
| Example 20 | C | C | C |

TABLE 10-continued

| | Evaluation of printability: continuous printing Copying machine "Able1321" (Fuji Xerox Co., Ltd.) | | |
|---|---|---|---|
| Examples | Wood free paper | Synthetic paper 3 | Synthetic paper 4 |
| Example 1 | A | A | A |
| Example 2 | A | A | A |
| Example 3 | B | B | B |
| Example 4 | C | B | B |
| Example 5 | C | C | C |
| Example 6 | B | C | C |
| Example 7 | C | C | B |
| Example 8 | B | B | B |
| Example 9 | — | B | B |
| Example 10 | B | B | C |
| Example 11 | B | C | C |
| Example 12 | C | C | B |
| Example 13 | C | B | B |
| Example 14 | B | B | C |
| Example 15 | B | C | B |
| Example 16 | B | C | B |
| Example 17 | B | B | C |
| Example 18 | B | C | B |
| Example 19 | C | C | C |
| Example 20 | B | C | C |

| | Evaluation of printability: evaluation of printed images Ink jet printer "PM-750C" (Epson Corp.) | | |
|---|---|---|---|
| Examples | Wood free paper | Synthetic paper 1 | Synthetic paper 2 |
| Example 1 | B | A | A |
| Example 2 | B | A | A |
| Example 3 | B | A | A |
| Example 4 | B | A | A |
| Example 5 | B | A | A |
| Example 6 | B | A | A |
| Example 7 | B | A | A |
| Example 8 | B | A | A |
| Example 9 | B | A | A |
| Example 10 | B | A | A |
| Example 11 | B | A | A |
| Example 12 | B | A | A |
| Example 13 | B | A | A |
| Example 14 | B | A | A |
| Example 15 | B | A | A |
| Example 16 | B | A | A |
| Example 17 | B | A | A |
| Example 18 | B | A | A |
| Example 19 | B | A | A |
| Example 20 | B | A | A |

| | Evaluation of printability: evaluation of printed images Laser printer "LBP-750C" (Canon Co., Ltd.) | | |
|---|---|---|---|
| Examples | Wood free paper | Synthetic paper 3 | Synthetic paper 4 |
| Example 1 | A | A | A |
| Example 2 | A | A | A |
| Example 3 | A | A | A |
| Example 4 | A | A | A |
| Example 5 | A | A | A |
| Example 6 | A | A | A |
| Example 7 | A | A | A |
| Example 8 | A | A | A |
| Example 9 | A | A | A |
| Example 10 | A | A | A |
| Example 11 | A | A | A |
| Example 12 | A | A | A |
| Example 13 | A | A | A |
| Example 14 | A | A | A |
| Example 15 | A | A | A |
| Example 16 | A | A | A |

TABLE 10-continued

| Examples    |   |   |   |
|-------------|---|---|---|
| Example 17  | A | A | A |
| Example 18  | A | A | A |
| Example 19  | A | A | A |
| Example 20  | A | A | A |

Evaluation of printability: evaluation of printed images
Copying machine "Able1321" (Fuji Xerox Co., Ltd.)

| Examples   | Wood free paper | Synthetic paper 3 | Synthetic paper 4 |
|------------|-----------------|-------------------|-------------------|
| Example 1  | A | A | A |
| Example 2  | A | A | A |
| Example 3  | A | A | A |
| Example 4  | A | A | A |
| Example 5  | A | A | A |
| Example 6  | A | A | A |
| Example 7  | A | A | A |
| Example 8  | A | A | A |
| Example 9  | A | A | A |
| Example 10 | A | A | A |
| Example 11 | A | A | A |
| Example 12 | A | A | A |
| Example 13 | A | A | A |
| Example 14 | A | A | A |
| Example 15 | A | A | A |
| Example 16 | A | A | A |
| Example 17 | A | A | A |
| Example 18 | A | A | A |
| Example 19 | A | A | A |
| Example 20 | A | A | A |

What is claimed is:

1. A magnetic display sheet comprising:
   a magnet sheet having a magnetized surface and a non-magnetized surface, which magnet sheet comprises:
   400 to 1,900 parts by weight of at least one kind of magnetic particles selected from the group consisting of magnetoplumbite-structure ferrite particles and rare-earth magnet particles, as a filler, and
   100 parts by weight of a binder comprising 50 to 95% by weight of at least one thermoplastic elastomer selected from the group consisting of a styrene-isoprene-styrene block copolymer resin, a styrene-ethylene.butylene-styrene block copolymer resin and an ethylene-propylene copolymer rubber, and 5 to 50% by weight of at least one soft polyolefin selected from the group consisting of a propylene homopolymer and a propylene-ethylene copolymer; and
   a printing paper sheet for being printed on, said paper sheet being bonded to said non-magnetized surface of the magnet sheet.

2. The magnetic display sheet according to claim 1, wherein said binder further contains at least one modified resin selected from the group consisting of an ethylene-propylene-diene copolymer rubber and an ethylene-butene copolymer resin, in an amount of 5 to 30 parts by weight based on 100 parts by weight of the total amount of said thermoplastic elastomer and said soft polyolefin.

3. The magnetic display sheet according to claim 1, wherein the content of a rubber component of the styrene-isoprene-styrene block copolymer resin as said thermoplastic elastomer is 40 to 90% by weight, and the styrene-isoprene-styrene block copolymer resin has a density of 0.92 to 0.95 g/cc and a number-average molecular weight of 30,000 to 300,000.

4. The magnetic display sheet according to claim 1, wherein the content of a rubber component of the styrene-ethylene.butylene-styrene block copolymer resin as said thermoplastic elastomer is 63 to 87% by weight, and the styrene-ethylene.butylene-styrene block copolymer resin has a density of 0.90 to 0.91 g/cc.

5. The magnetic display sheet according to claim 1, wherein the content of a rubber component of the ethylene-propylene-copolymer rubber as said thermoplastic elastomer is 20 to 52% by weight, and the ethylene-propylene copolymer rubber has a specific gravity of 0.86 to 0.88.

6. The magnetic display sheet according to claim 1, wherein said soft polyolefin has a melt flow rate at 230° C. according to ASTM D1238 of 1 to 40 g/10 min.

7. The magnetic display sheet according to claim 1, wherein said soft polyolefin has a flexural modulus according to ASTM D1238 of 30 to 300 MPa, a density of 0.87 to 0.89 g/cc and a softening point of 40 to 112° C.

8. The magnetic display sheet according to claim 1, wherein said binder contains a plasticizer in an amount of less than 0.5 part by weight based on 100 parts by weight of said binder and a lubricant in an amount of less than 1 part by weight based on 100 parts by weight of said binder.

9. The magnetic display sheet according to claim 1, wherein said binder contains no plasticizer and lubricant.

10. The magnetic display sheet according to claim 2, wherein the content of a propylene block of the ethylene-propylene-diene copolymer rubber as said modified resin is 20 to 30% by weight, and the ethylene-propylene-diene copolymer rubber has a melt flow rate at 230° C. according to ASTM D1238 of not less than 0.1 g/10 min. and less than 1 g/10 min., and a Mooney viscosity at 100° C. of 10 to 90.

11. The magnetic display sheet according to claim 2, wherein the content of a butene block of the ethylene-butene copolymer resin as said modified resin is 18 to 35% by weight, and the ethylene-butene copolymer has a Vicat softening point according to JIS K7206 of 30 to 60° C.

12. The magnetic display sheet according to claim 1, wherein said magnetoplumbite-structure ferrite particles have an average particle size of 0.1 to 20.0 μm, a BET specific surface area of 1 to 10 m$^2$/g, a coercive force (iHc) of 1,500 to 7,000 Oe and a residual magnetization of 20 to 60 emu/g.

13. The magnetic display sheet according to claim 1, wherein said rare-earth magnet particles has an average particle size of 1 to 100 μm, a BET specific surface area of 0.5 to 2 m$^2$/g, a coercive force (iHc) of 3,000 to 9,000 Oe and a residual magnetization of 80 to 400 emu/g.

14. A magnetic display sheet according to claim 1, wherein said printing paper sheet is wood free papers and synthetic papers.

15. A magnetic display sheet according to claim 1, which further has a thickness of not more than 2 mm.

16. A magnetic display sheet according to claim 1, which further has a thickness of 0.095 to 0.35 mm.

17. A magnetic display sheet according to claim 1, which further has a surface magnetic flux density of 100 to 800 Gauss, and a tensile strength of 2 to 4.0 MPa.

* * * * *